(12) United States Patent
Takikawa et al.

(10) Patent No.: US 11,760,849 B2
(45) Date of Patent: Sep. 19, 2023

(54) PREPREG RESIN COMPOSITION, PREPREG AND MOLDED ARTICLE

(71) Applicant: DIC Corporation, Tokyo (JP)

(72) Inventors: Yuko Takikawa, Takaishi (JP); Tomoaki Shinchi, Takaishi (JP)

(73) Assignee: DIC Corporation, Tokyo (JP)

( * ) Notice: Subject to any disclaimer, the term of this patent is extended or adjusted under 35 U.S.C. 154(b) by 751 days.

(21) Appl. No.: 16/649,381

(22) PCT Filed: Sep. 11, 2018

(86) PCT No.: PCT/JP2018/033578
§ 371 (c)(1),
(2) Date: May 7, 2020

(87) PCT Pub. No.: WO2019/065210
PCT Pub. Date: Apr. 4, 2019

(65) Prior Publication Data
US 2020/0385539 A1    Dec. 10, 2020

(30) Foreign Application Priority Data

Sep. 27, 2017 (JP) .................................. 2017-186328

(51) Int. Cl.
C08J 5/04 (2006.01)

(52) U.S. Cl.
CPC ............ C08J 5/042 (2013.01); *C08J 2333/12* (2013.01); *C08J 2375/04* (2013.01)

(58) Field of Classification Search
CPC ..... C08J 5/042; C08J 2333/12; C08J 2375/04
USPC ....................................................... 525/453
See application file for complete search history.

(56) References Cited

U.S. PATENT DOCUMENTS

| | | |
|---|---|---|
| 4,232,133 A | 11/1980 | Ferrarini, Jr. et al. |
| 4,287,116 A | 9/1981 | Burns |
| 5,330,820 A * | 7/1994 | Li ................ F41H 5/0485 428/113 |
| 2015/0361035 A1 | 12/2015 | Moroiwa et al. |
| 2017/0130019 A1 | 5/2017 | Sun et al. |

FOREIGN PATENT DOCUMENTS

| | | | |
|---|---|---|---|
| CA | 2039840 A | * 10/1991 | ............ C08J 5/24 |
| EP | 3434718 A1 | 1/2019 | |
| JP | S55-21482 A | 2/1980 | |
| JP | S55-164217 A | 12/1980 | |
| JP | S61-225210 A | 10/1986 | |
| JP | S62-30640 A | 2/1987 | |
| JP | S62-292841 A | 12/1987 | |
| JP | H04-227642 A | 8/1992 | |
| JP | H07-216050 A | 8/1995 | |
| JP | H07-507012 A | 8/1995 | |
| JP | 2016-029133 A | 3/2016 | |
| JP | 2017-519885 A | 7/2017 | |
| WO | 2013/084967 A1 | 6/2013 | |
| WO | 2014/119234 A1 | 8/2014 | |
| WO | 2017/163899 A1 | 9/2017 | |

OTHER PUBLICATIONS

Supplementary European Search Report dated May 14, 2021, issued for European Patent Application No. 18861848.2.
International Search Report dated Dec. 18, 2018, issued for PCT/JP2018/033578.

* cited by examiner

*Primary Examiner* — Kelechi C Egwim
(74) *Attorney, Agent, or Firm* — Locke Lord LLP; James E. Armstrong, IV; Nicholas J. DiCeglie, Jr.

(57) ABSTRACT

Provided is a prepreg resin composition, containing: a urethane (meth)acrylate (A) that is a reaction product of polyisocyanate (a1), polyol (a2), and hydroxy alkyl (meth) acrylate (a3); a polymerization initiator (B); and a thermoplastic resin (C), as an essential component, in which the polyisocyanate (a1) is at least one polyisocyanate selected from 2,4'-diphenyl methane diisocyanate, 4,4'-diphenyl methane diisocyanate, a carbodiimide modified product of 4,4'-diphenyl methane diisocyanate, and polymethylene polyphenyl polyisocyanate. The prepreg resin composition of the invention is excellent in molding properties, and is capable of forming a molded article excellent in various physical properties such as flexibility, impact resistance, and heat resistance, and thus, can be preferably used in a prepreg and a molded article thereof.

6 Claims, No Drawings

PREPREG RESIN COMPOSITION, PREPREG AND MOLDED ARTICLE

TECHNICAL FIELD

The present invention relates to a prepreg that is excellent in workability and molding properties and is capable of forming a molded article excellent in various physical properties such as heat resistance, and to a molded article thereof.

BACKGROUND ART

Fiber-reinforced resin composite materials which are reinforced with reinforcing fibers such as carbon fibers or glass fibers have drawn attention in terms of their light-weight and characteristics such as excellent heat resistance or mechanical strength, and the use of the fiber-reinforced resin composite materials is expanding in various structural applications such as casing bodies or various members for automobiles and airplanes. Such fiber-reinforced resin composite materials are formed using, for example, a method in which an intermediate material called a prepreg, which is obtained by impregnating reinforcing fibers with a thermosetting resin, is used and subjected to curing and molding by autoclave molding or press molding, as a molding method.

In general, resins for prepregs are required to have both stability at a room temperature and the ability to be cured by heating or the like, and thus, in general, thermosetting resins such as epoxy resin compositions are frequently used for prepregs. However, the prepregs using the epoxy resins have a problem in that the prepregs are cured at a room temperature, and thus, need to be stored under refrigerated conditions.

In order to solve such a problem, a molding material that is capable of achieving high productivity and stability at a room temperature has been developed (for example, refer to PTL 1). The molding material contains a urethane (meth)acrylate compound having a specific structure, and a reinforcing fiber, but is insufficient for molding properties that are required for the prepregs.

Therefore, there has been a need for a material that has excellent workability and molding properties and is capable of forming a molded article excellent in various physical properties such as flexibility, impact resistance, and heat resistance.

CITATION LIST

Patent Literature

PTL 1: JP-A-2016-29133

SUMMARY OF INVENTION

Technical Problem

An object to be achieved by the invention is to provide a prepreg resin composition that is excellent in molding properties and is capable of forming a molded article excellent in various physical properties such as flexibility, impact resistance, and heat resistance, and a prepreg and a molded article thereof.

Solution to Problem

The present inventors have found that a prepreg resin composition containing specific urethane (meth)acrylate, a polymerization initiator, and a thermoplastic resin, as an essential raw material, and a prepreg are excellent in molding properties, and are capable of forming a molded article excellent in various physical properties such as flexibility, impact resistance, and heat resistance, and thus, have completed the invention.

That is, the invention relates to a prepreg resin composition, containing: a urethane (meth)acrylate (A) that is a reaction product of polyisocyanate (a1), polyol (a2), and hydroxy alkyl (meth)acrylate (a3); a polymerization initiator (B); and a thermoplastic resin (C), as an essential component, in which the polyisocyanate (a1) is at least one polyisocyanate selected from 2,4'-diphenyl methane diisocyanate, 4,4'-diphenyl methane diisocyanate, a carbodiimide modified product of 4,4'-diphenyl methane diisocyanate, and polymethylene polyphenyl polyisocyanate, and a prepreg and a molded article thereof.

Advantageous Effects of Invention

A molded article obtained from the prepreg resin composition and the prepreg of the invention is excellent in flexibility, impact resistance, heat resistance, and the like, and thus, can be preferably used in automotive members, railroad car members, airspace craft members, ship members, house facility members, sports members, light-weight vehicle members, construction and civil engineering members, case bodies for OA instrument, and the like.

DESCRIPTION OF EMBODIMENTS

A prepreg resin composition of the invention is a prepreg resin composition, containing: a urethane (meth)acrylate (A) that is a reaction product of polyisocyanate (a1), polyol (a2), and hydroxy alkyl (meth)acrylate (a3); a polymerization initiator (B); and a thermoplastic resin (C), as an essential component, in which the polyisocyanate (a1) is at least one polyisocyanate selected from 2,4'-diphenyl methane diisocyanate, 4,4'-diphenyl methane diisocyanate, a carbodiimide modified product of 4,4'-diphenyl methane diisocyanate, and polymethylene polyphenyl polyisocyanate.

The urethane (meth)acrylate (A) is the reaction product of the polyisocyanate (a1), the polyol (a2), and the hydroxy alkyl (meth)acrylate (a3).

The polyisocyanate (a1) is one or more kinds of polyisocyanates selected from the 2,4'-diphenyl methane diisocyanate, the 4,4'-diphenyl methane diisocyanate, the carbodiimide modified product of the 4,4'-diphenyl methane diisocyanate, and the polymethylene polyphenyl polyisocyanate, and it is preferable that the polyisocyanate (a1) contains the polymethylene polyphenyl polyisocyanate from the viewpoint of further improving heat resistance of a molded article.

Other polyisocyanates in addition to the polyisocyanate (a1) can be used together as an isocyanate raw material of the urethane (meth)acrylate (A). For example, a nurate modified product of diphenyl methane diisocyanate, a biurette modified product, a urethane imine modified product, polyol modified product that is modified with polyol having a number average molecular weight of 1,000 or less, such as diethylene glycol or dipropylene glycol, aromatic polyisocyanate such as tolylene diisocyanate (TDI), tolidine diisocyanate, xylene diisocyanate, 1,5-naphthalene diisocyanate, and tetramethyl xylene diisocyanate; alicyclic polyisocyanate such as isophorone diisocyanate (IPDI), hydrogenerated diphenyl methane diisocyanate, hydrogenerated xylene diisocyanate, and norbornene diisocyanate;

hexamethylene diisocyanate, a nurate modified product of hexamethylene diisocyanate, a biurette modified product, an adduct, aliphatic polyisocyanate such as dimeric acid diisocyanate, and the like can be used as the other polyisocyanate.

The polyisocyanate (a1) is preferably 20% by mass or more, and is more preferably 50% by mass or more, in the isocyanate raw material of the urethane (meth)acrylate (A).

The polyol (a2) is not particularly limited, for example, an alkylene oxide adduct of bisphenol A, an alkylene oxide adduct of aromatic diol, polyester polyol, acryl polyol, polyether polyol, polycarbonate polyol, polyalkylene polyol, and the like can be used. Such polyols (a2) can be independently used, or two or more kinds thereof can also be used together.

Examples of the hydroxy alkyl (meth)acrylate (a3) include 2-hydroxy ethyl (meth)acrylate, 3-hydroxy propyl (meth)acrylate, 4-hydroxy-n-butyl (meth)acrylate, 2-hydroxy propyl (meth)acrylate, 2-hydroxy-n-butyl (meth)acrylate, and 3-hydroxy-n-butyl (meth)acrylate, and the 2-hydroxy ethyl (meth)acrylate is preferable. Note that, such hydroxy alkyl (meth)acrylates (a3) can be independently used, or two or more kinds thereof can also be used together.

It is preferable that the hydroxy alkyl (meth)acrylate (a3) is a range of 5% by mass to 50% by mass, in the prepreg resin composition.

A molar ratio (NCO/OH) of an isocyanate group (NCO) of an isocyanate compound, containing the raw material of the urethane (meth)acrylate (A), to a hydroxyl group (OH) of a compound having a hydroxyl group is preferably 0.7 to 1.5, is more preferably 0.8 to 1.3, and is even more preferably 0.8 to 1.0.

The polymerization initiator (B) is not particularly limited, but an organic peroxide is preferable, and a diacylperoxide compound, a peroxyester compound, a hydroperoxide compound, a ketone peroxide compound, an alkyl perester compound, a percarbonate compound, peroxyketal, and the like are exemplified and can be suitably selected in accordance with a molding condition. Note that, such polymerization initiators (B) can be independently used, or two or more kinds thereof can also be used together.

In addition, among them, in order to shorten a molding time, it is preferable to use a polymerization initiator in which a temperature for obtaining 10-hour half life is 70° C. or higher and 100° C. or lower. It is preferable that the temperature is 70° C. or higher and 100° C. or lower, since the life of the prepreg at a room temperature increases, and curing can be performed for a short period of time (within 5 minutes) by heating, and the polymerization initiator is combined with the prepreg of the invention, and thus, more excellent ability to be cured and molding properties are obtained. Examples of the polymerization initiator include 1,6-bis(t-butylperoxycarbonyloxy)hexane, 1,1-bis(t-butylperoxy)cyclohexane, 1,1-bis(t-amylperoxy)cyclohexane, 1,1-bis(t-hexylperoxy)cyclohexane, t-butylperoxy diethyl acetate, t-butylperoxyisopropyl carbonate, t-amylperoxyisopropyl carbonate, t-hexylperoxyisopropyl carbonate, di-tert-butylperoxyhexahydroterephthalate, t-amylperoxytrimethylhexanoate, and t-hexylperoxy-2-ethylhexanoate.

It is preferable that the content of the polymerization initiator (B) is in a range of 0.3% by mass to 3% by mass, in the prepreg resin composition, from the viewpoint of excellent curing properties and storage stability.

Examples of the thermoplastic resin (C) include a polyurethane resin, a polyamide resin, a polyethylene terephthalate resin, a polybutylene terephthalate resin, a polycarbonate resin, a polypropylene resin, a polyethylene resin, a polystyrene resin, an acryl resin, a polybutadiene resin, a polyisoprene resin, and products thereof modified by copolymerization, and among them, a thermoplastic polyurethane resin is preferable, and a thermoplastic polyurethane containing polyalkylene ether polyol as an essential raw material is more preferable, from the viewpoint of further improving flexibility, impact resistance, and heat resistance of a molded article to be obtained. Such thermoplastic resins can be independently used, or two or more kinds thereof can also be used together.

In addition, the thermoplastic resin (C) can also be used by being added in a particulate state, or can also be used by being melted and mixed. In the case of using the thermoplastic resin in a particulate state, the diameter of the particles is preferably 30 μm or less, and is more preferably 20 μm or less, from the viewpoint of dispersibility with respect to a fiber.

It is preferable that the content of the thermoplastic resin (C) is in a range of 1% by mass to 25% by mass, in the prepreg resin composition, from the viewpoint of further improving of the flexibility, the impact resistance, and the heat resistance of the molded article to be obtained.

In addition, as necessary, an ethylenically unsaturated monomer may be used as the raw material of the prepreg resin composition of the invention. Examples of the ethylenically unsaturated monomer include a styrene compound such as styrene, methylstyrene, halogenated styrene, and divinylbenzene; a monofunctional (meth)acrylate compound such as methyl (meth)acrylate, ethyl (meth)acrylate, propyl (meth)acrylate, butyl (meth)acrylate, 2-ethylhexyl (meth)acrylate, cyclohexyl (meth)acrylate, isobornyl (meth)acrylate, benzyl (meth)acrylate, methylbenzyl (meth)acrylate, phenoxyethyl (meth)acrylate, methylphenoxyethyl (meth)acrylate, morpholine (meth)acrylate, phenylphenoxyethyl acrylate, phenylbenzyl (meth)acrylate, phenyl methacrylate, dicyclopentenyl (meth)acrylate, dicyclopentenyloxyethyl (meth)acrylate, and dicyclopentanyl methacrylate; a hydroxyl group-containing (meth)acrylate compound such as hydroxyethyl (meth)acrylate, hydroxypropyl (meth)acrylate, and hydroxybutyl (meth)acrylate; a di(meth)acrylate compound such as ethylene glycol di(meth)acrylate, propylene glycol di(meth)acrylate, 1,4-butane diol di(meth)acrylate, 1,6-hexane diol di(meth)acrylate, bisphenol di(meth)acrylate, and 1,4-cyclohexanedimethanol di(meth)acrylate. Such ethylenically unsaturated monomers can be independently used, or two or more kinds thereof can also be used together.

Among them, monofunctional (meth)acrylate having a molecular weight of 150 to 250 is preferable, the phenoxyethyl (meth)acrylate, the methylphenoxyethyl (meth)acrylate, the benzyl (meth)acrylate, and the methylbenzyl (meth)acrylate are more preferable, and the phenoxyethyl (meth)acrylate and the benzyl (meth)acrylate are even more preferable, from the viewpoint of mechanical strength and heat resistance of a molded article for handling malodor and a hazardous product in a work environment.

The ethylenically unsaturated monomer in the prepreg resin composition of the invention is preferably 50% by mass or less, and is more preferably 30% by mass or less, from the viewpoint of a balance in workability (tack properties), the heat resistance, and the ability to be cured.

Components other than those described above may be used as the component of the prepreg resin composition of the invention, and for example, a thermosetting resin, a polymerization inhibitor, a curing promoter, a filler, a low shrinkage agent, a releasing agent, a thickening agent, a viscosity-reducing agent, a pigment, an anti-oxidant, a plasticizer, a flame retardant, an anti-microbial agent, a UV stabilizer, a reinforcing agent, a photocuring agent, and the like can be contained.

Examples of the thermosetting resin include a vinyl ester resin, an unsaturated polyester resin, a phenol resin, a melamine resin, and a furan resin. In addition, such thermosetting resins can be independently used, or two or more kinds thereof can also be used together.

Examples of the polymerization inhibitor include hydroquinone, trimethylhydroquinone, p-t-butylcatechol, t-butylhydroquinone, toluhydroquinone, p-benzoquinone, naphthoquinone, hydroquinone monomethyl ether, phenothiazine, copper naphthenate, and copper chloride. Such polymerization inhibitors can be independently used, or two or more kinds thereof can also be used together.

Examples of the curing promoter include metal soaps such as cobalt naphthenate, cobalt octenate, vanadyl octenate, copper naphthenate, and barium naphthenate, and a metal chelate compound such as vanadyl acetylacetate, cobalt acetyl acetate, and iron acetylacetonate. In addition, examples of amines include N,N-dimethylamino-p-benzaldehyde, N,N-dimethylaniline, N,N-diethylaniline, N,N-dimethyl-p-toluidine, N-ethyl-m-toluidine, triethanolamine, m-toluidine, diethylenetriamine, pyridine, phenylmorpholine, piperidine, and diethanolaniline. Such curing promoters can be independently used, or two or more kinds thereof can also be used together.

Examples of the filler include an inorganic compound and an organic compound, and the filler can be used for adjusting the physical properties of the molded article such as strength, elasticity, impact strength, and fatigue durability.

Examples of the inorganic compound include calcium carbonate, magnesium carbonate, barium sulfate, mica, talc, kaolin, clay, celite, asbestos, barite, barita, silica, siliceous sand, dolomite limestone, gypsum, an aluminum finer powder, a hollow balloon, alumina, a glass powder, aluminum hydroxide, galuberite, zirconium oxide, antimony trioxide, titanium oxide, molybdenum dioxide, and an iron powder.

Examples of the organic compound include a natural polysaccharide powder such as cellulose or chitin, and a synthetic resin powder, and a powder of organic materials configured of a hard resin, soft rubber, and an elastomer or a polymer (a copolymer) or particles having a multilayer structure such as a core-shell structure can be used as the synthetic resin powder. Specifically, acryl particles, polyamide particles, particles formed of butadiene rubber and/or acryl rubber, urethane rubber, silicon rubber, and the like, a polyimide resin powder, a fluororesin powder, a phenol resin powder, and the like are exemplified. Such fillers can be independently used, or two or more kinds thereof can also be used together.

Examples of the releasing agent include zinc stearate, calcium stearate, paraffin wax, polyethylene wax, and carnauba wax. The paraffin wax, the polyethylene wax, the carnaubawax, and the like are preferable. Such releasing agents can be independently used, or two or more kinds thereof can also be used together.

For example, a metal oxide or a metal hydroxide such as magnesium oxide, magnesium hydroxide, calcium oxide, and calcium hydroxide, microparticles of acrylic resin, and the like are exemplified as the thickening agent, and can be suitably selected in accordance with handling properties of the prepreg of the invention. Such thickening agents can be independently used, or two or more kinds thereof can also be used together.

The prepreg of the invention contains the prepreg resin composition and the reinforcing fiber (D), and examples of the reinforcing fiber (D) include an organic fiber such as a carbon fiber, a glass fiber, a silicon carbide fiber, an alumina fiber, a boron fiber, a metal fiber, an aramid fiber, a vinylon fiber, and a tetoron fiber, and among them, the carbon fiber or the glass fiber is preferable, and the carbon fiber is more preferable, from the viewpoint of obtaining a molded article having higher strength and higher elasticity. Such reinforcing fibers (D) can be independently used, or two or more kinds thereof can also be used together.

Various carbon fibers such as a polyacrylonitrile-based carbon fiber, a pitch-based carbon fiber, and a rayon-based carbon fiber can be used as the carbon fiber, and among them, the polyacrylonitrile-based carbon fiber is preferable from the viewpoint of easily obtaining a carbon fiber having high strength.

The shape of the reinforcing fiber (D) is not particularly limited, a reinforcing fiber tow in which reinforcing fiber filaments are tied up, a unidirectional material in which reinforcing fiber tows are aligned in one direction, a woven fabric or a reinforcing fiber cut short, or a non-woven fabric or paper formed of a reinforcing fiber cut short, and the like are exemplified, and it is preferable that the unidirectional material is used as the reinforcing fiber, and is laminated and molded, since high mechanical and physical properties can be obtained.

In the case of using the reinforcing fiber cut short, it is preferable to use a carbon fiber cut to 2.5 mm to 50 mm, from the viewpoint of further improving in-mold fluidity in molding and the external appearance of the molded article.

In the case of the woven fabric, a sheet in which fiber bundles are aligned in one direction, represented by plain weave, twill weave, sateen weave, or a non-crimp fabric, a stitching sheet in which sheets laminated by changing angles are stitched not to be loosened, and the like are exemplified.

Weight per unit area of the reinforcing fiber (a weight per 1 $m^2$ of the fiber) is not particularly limited, but is preferably 10 $g/m^2$ to 650 $g/m^2$. It is preferable that the weight per unit area is 10 $g/m^2$ or more, since unevenness in a fiber width is small, and mechanical physical properties are excellent. It is preferable that the weight per unit area is 650 $g/m^2$ or less, since the impregnation of the resin is excellent. The weight per unit area is even more preferably 50 $g/m^2$ to 500 $g/m^2$, and is particularly preferably 50 $g/m^2$ to 300 $g/m^2$.

A content rate of the reinforcing fiber (D) in the prepreg of the invention is preferably in a range of 20% by mass to 85% by mass, and is more preferably in a range of 40% by mass to 80% by mass, from the viewpoint of further improving mechanical strength of a molded article to be obtained.

The prepreg of the invention, for example, is obtained by Step 1 of impregnating the reinforcing fiber (D) with a resin solution in which the polyisocyanate (a1), the polyol (a2), the hydroxy alkyl (meth)acrylate (a3), the polymerization initiator (B), and the thermoplastic resin (C) are mixed, by using a known mixing machine such as a planetary mixer and a kneader, of interposing the reinforcing fiber between PET release films from an upper surface, and of performing rolling with a rolling machine to obtain a sheet, and Step 2 of leaving the sheet to stand at a room temperature to 50° C., and of reacting an isocyanate group of the polyisocyanate (a1) with a hydroxyl group of the polyol (a2) and the hydroxy alkyl (meth)acrylate (a3). In addition, in Step 1, the polyisocyanate (a1), the polyol (a2), and the hydroxy alkyl (meth)acrylate (a3) can also be partially reacted in advance, for use within a range not impairing impregnating properties with respect to the fiber.

It is preferable that the thickness of the prepreg of the invention is 0.02 mm to 1.0 mm. It is preferable that the thickness is 0.02 mm or more, since handling for laminating is facilitated, and it is preferable that the thickness is 1 mm or less, since the impregnation of the resin is excellent. It is more preferable that the thickness of the prepreg is 0.05 mm to 0.5 mm.

As a method for obtaining a molded article from the prepreg obtained as described above, for example, a method is used in which the prepreg is peeled off from the PET release films, and 8 to 16 prepregs are laminated, and then, are put into a mold heated in advance at 110° C. to 160° C., and mold clamping is performed with a compression molding machine, the prepreg is shaped, and is cured by retaining a molding pressure of 0.1 MPa to 10 MPa, and then, a molded article is taken out. In this case, a manufacturing method is preferable in which the thermal compression molding is performed by retaining a mold temperature of 120° C. to 160° C. in a mold including a share edge structure, a prescribed time for 1 minute to 2 minutes per a thickness of 1 mm of a molded article, and a molding pressure of 1 MPa to 8 MPa.

The molded article obtained from the prepreg of the invention is excellent in heat resistance, interlayer shear strength, and the like, and thus, can be preferably used in automotive members, railroad car members, airspace craft members, ship members, house facility members, sports members, light-weight vehicle members, construction and civil engineering members, case bodies for OA instrument, and the like.

EXAMPLES

Hereinafter, the invention will be described in more detail by specific examples.

Synthesis Example 1: Manufacturing of Thermoplastic Resin (C-1)

71 parts of PTMG1000 (manufactured by Mitsubishi Chemical Corporation: Polytetramethylene Ether Glycol), 3 parts of 1,4-butanediol, and 26 parts of 4,4'-diphenylmethane diisocyanate were mixed, were cast to a vat, and were reacted in a condition of 90° C. for 24 hours, and thus, a thermoplastic resin (C-1) was prepared. The weight average molecular weight of the thermoplastic resin (C-1) was 50000.

Synthesis Example 2: Manufacturing of Thermoplastic Resin (C-2)

73 parts of PTMG1000 (manufactured by Mitsubishi Chemical Corporation: Polytetramethylene Ether Glycol), 3 parts of 1,4-butanediol, and 24 parts of 4,4'-diphenylmethane diisocyanate were mixed, were cast to a vat, and were reacted in a condition of 90° C. for 24 hours, and thus, a thermoplastic resin (C-2) was manufactured. The weight average molecular weight of the thermoplastic resin (C-2) was 10000.

Synthesis Example 3: Manufacturing of Thermoplastic Resin (C-3)

74 parts of PTMG1000 (manufactured by Mitsubishi Chemical Corporation: Polytetramethylene Ether Glycol), 2 parts of 1,4-butanediol, and 24 parts of 4,4'-diphenylmethane diisocyanate were mixed, were cast to a vat, and were reacted in a condition of 90° C. for 24 hours, and thus, a thermoplastic resin (C-3) was manufactured. The weight average molecular weight of the thermoplastic resin (C-3) was 150000.

Example 1: Manufacturing and Evaluation of Prepreg Resin Composition (1)

19 parts of NEWPOL BPE-20 (manufactured by Sanyo Chemical Industries, Ltd.: EO Adduct of Bisphenol A, Hydroxyl Equivalent of 164 g/eq), 24 parts of NEWPOL BPE-40 (manufactured by Sanyo Chemical Industries, Ltd.: EO Adduct of Bisphenol A, Hydroxyl Equivalent of 204 g/eq), and 44 parts of the thermoplastic resin (C-1) were mixed at 150° C. and were cooled, and then, 79 parts of hydroxy ethyl methacrylate, 3 parts of a polymerization initiator ("Trigonox 122-C80", manufactured by Kayaku Akzo Corporation: organic peroxide), 20 parts of a mixture of polymethylene polyphenyl polyisocyanate and diphenylmethane diisocyanate ("MILLIONATE MR-200", manufactured by Tosoh Corporation), and 80 parts of 4,4'-diphenyl methane diisocyanate were mixed, flowed into molds having thicknesses of 2 mm and 6 mm, and were aged in a condition of 45° C. for 24 hours, and thus, a prepreg resin composition (1) was obtained.

In addition, 19 parts of NEWPOL BPE-20 (manufactured by Sanyo Chemical Industries, Ltd.: EO Adduct of Bisphenol A, Hydroxyl Equivalent of 164 g/eq), 24 parts of NEWPOL BPE-40 (manufactured by Sanyo Chemical Industries, Ltd.: EO Adduct of Bisphenol A, Hydroxyl Equivalent of 204 g/eq), and 44 parts of the thermoplastic resin (C-1) were mixed at 150° C. and were cooled, and then, 79 parts of hydroxy ethyl methacrylate, 3 parts of a polymerization initiator ("Trigonox 122-C80", manufactured by Kayaku Akzo Corporation: organic peroxide), 20 parts of a mixture of polymethylene polyphenyl polyisocyanate and diphenylmethane diisocyanate ("MILLIONATE MR-200", manufactured by Tosoh Corporation), and 80 parts of 4,4'-diphenylmethane diisocyanate were mixed and were applied onto one surface of a PET release film, and then, a carbon fiber ("TRK979PQRW", manufactured by Mitsubishi Rayon Co., Ltd.) was impregnated by a hand lay-up method such that a carbon fiber content was 55%, was covered with the same PET release film, and then, was aged in a condition of 45° C. for 24 hours, and thus, a prepreg (1) was prepared. A molar ratio (NCO/OH) of the raw materials in the prepreg (1) excluding the carbon fiber was 0.93. In addition, a thickness was 0.25 mm.

[Evaluation of Flexibility]

The prepreg resin composition (1) having a thickness of 2 mm, obtained as described above, was cured in a condition of 150° C. for 30 minutes, and thus, a cured product was obtained. An extension rate of the obtained cured product was measured in accordance with JIS K 7161, and was evaluated in accordance with the following criteria.

○: 4% or more

X: Less than 4%

[Evaluation of Impact Resistance]

The prepreg resin composition (1) having a thickness of 6 mm, obtained as described above, was cured in a condition of 150° C. for 30 minutes, and thus, a cured product was obtained. The obtained cured product was cut out to have a width of 12.7 mm and a length of 150 mm by a diamond cutter, and fracture toughness was measured in accordance with ASTM D5045-99, and was evaluated in accordance with the following criteria.

○: 1.8 MPa·m$^{0.5}$ or more

X: Less than 1.8 MPa·m$^{0.5}$

[Preparation of Molded Article]

Eight prepregs (1) obtained as described above were laminated and were subjected to heat pressure molding by using a plate-shaped mold of 300 mm×300 mm×3 mm, in a condition of a mold temperature of 140° C. and a mold-closed pressure of 0.98 MPa for 5 minutes, and thus, a molded article (1) was obtained.

[Evaluation of Molding Properties]

A difference between a carbon fiber content rate of the prepreg (1) and a carbon fiber content rate of the molded article (1) obtained as described above was measured, and molding properties were evaluated in accordance with the following criteria.

◯: The difference in the carbon fiber content rates is less than 5%

Δ: The difference in the carbon fiber content rates is 5% or more and less than 10%

X: The difference in the carbon fiber content rates is 10% or more

[Heat Resistance]

A test piece having a width 5 mm and a length 55 mm was cut out from the molded article (1) obtained as described above, and in the test piece, dynamic viscoelasticity according to both end-bending of a cured product was measured by using "DMS6100", manufactured by SII Nanotechnology Inc., at a measurement frequency of 1 Hz and a temperature increase rate of 3° C./minute. In a chart of a storage elasticity that was obtained, an intersection between an approximate straight line of a glass region and a tangential line of a transition region was set to a glass transition temperature, and heat resistance was evaluated in accordance with the following criteria.

◯: The glass transition temperature is 120° C. or higher

Δ: The glass transition temperature is 100° C. or higher and lower than 120° C.

X: The glass transition temperature is lower than 100° C.

[Evaluation of Flexibility of Molded Article]

A test piece having a width of 15 mm and a length of 60 mm was cut out from the molded article (1) obtained as described above, and in the test piece, bending strength of a fiber unidirectional material in an orthogonal direction (90°) was measured in accordance with JIS K7017, and was evaluated in accordance with the following criteria.

◯: The bending strength is 90 MPa or more

Δ: The bending strength is 70 MPa or more and less than 90 MPa

X: The bending strength is less than 70 MPa

Example 2: Manufacturing and Evaluation of Prepreg Resin Composition (2)

19 parts of NEWPOL BPE-20 (manufactured by Sanyo Chemical Industries, Ltd.: EO Adduct of Bisphenol A, Hydroxyl Equivalent of 164 g/eq), 24 parts of NEWPOL BPE-40 (manufactured by Sanyo Chemical Industries, Ltd.: EO Adduct of Bisphenol A, Hydroxyl Equivalent of 204 g/eq), and 22 parts of the thermoplastic resin (C-1) were mixed at 150° C. and were cooled, and then, 79 parts of hydroxy ethyl methacrylate, 3 parts of a polymerization initiator ("Trigonox 122-C80", manufactured by Kayaku Akzo Corporation: organic peroxide), 20 parts of a mixture of polymethylene polyphenyl polyisocyanate and diphenylmethane diisocyanate ("MILLIONATE MR-200", manufactured by Tosoh Corporation), and 80 parts of 4,4'-diphenyl methane diisocyanate were mixed, flowed into molds having thicknesses of 2 mm and 6 mm, and were aged in a condition of 45° C. for 24 hours, and then, a prepreg resin composition (2) was obtained.

In addition, 19 parts of NEWPOL BPE-20 (manufactured by Sanyo Chemical Industries, Ltd.: EO Adduct of Bisphenol A, Hydroxyl Equivalent of 164 g/eq), 24 parts of NEWPOL BPE-40 (manufactured by Sanyo Chemical Industries, Ltd.: EO Adduct of Bisphenol A, Hydroxyl Equivalent of 204 g/eq), and 22 parts of the thermoplastic resin (C-1) were mixed at 150° C. and were cooled, and then, 79 parts of hydroxy ethyl methacrylate, 3 parts of a polymerization initiator ("Trigonox 122-C80", manufactured by Kayaku Akzo Corporation: organic peroxide), 20 parts of a mixture of polymethylene polyphenyl polyisocyanate and diphenylmethane diisocyanate ("MILLIONATE MR-200", manufactured by Tosoh Corporation), and 80 parts of 4,4'-diphenylmethane diisocyanate were mixed and were applied onto one surface of a PET release film, and then, a carbon fiber ("TRK979PQRW", manufactured by Mitsubishi Rayon Co., Ltd.) was impregnated by a hand lay-up method such that a carbon fiber content was 55%, was covered with the same PET release film, and then, was aged in a condition of 45° C. for 24 hours, and thus, a prepreg (2) was prepared. A molar ratio (NCO/OH) of the raw materials in the prepreg (2) excluding the carbon fiber was 0.93. In addition, a thickness was 0.25 mm.

Example 3: Manufacturing and Evaluation of Prepreg Resin Composition (3)

19 parts of NEWPOL BPE-20 (manufactured by Sanyo Chemical Industries, Ltd.: EO Adduct of Bisphenol A, Hydroxyl Equivalent of 164 g/eq), 24 parts of NEWPOL BPE-40 (manufactured by Sanyo Chemical Industries, Ltd.: EO Adduct of Bisphenol A, Hydroxyl Equivalent of 204 g/eq), and 11 parts of the thermoplastic resin (C-1) were mixed at 150° C. and were cooled, and then, 79 parts of hydroxy ethyl methacrylate, 22 parts of polyamide particles ("2001UD", manufactured by Arkema S.A.), 3 parts of a polymerization initiator ("Trigonox 122-C80", manufactured by Kayaku Akzo Corporation: organic peroxide), 20 parts of a mixture of polymethylene polyphenyl polyisocyanate and diphenylmethane diisocyanate ("MILLIONATE MR-200", manufactured by Tosoh Corporation), and 80 parts of 4,4'-diphenyl methane diisocyanate were mixed, flowed into molds having thicknesses of 2 mm and 6 mm, and were aged in a condition of 45° C. for 24 hours, and thus, a prepreg resin composition (3) was obtained.

In addition, 19 parts of NEWPOL BPE-20 (manufactured by Sanyo Chemical Industries, Ltd.: EO Adduct of Bisphenol A, Hydroxyl Equivalent of 164 g/eq), 24 parts of NEWPOL BPE-40 (manufactured by Sanyo Chemical Industries, Ltd.: EO Adduct of Bisphenol A, Hydroxyl Equivalent of 204 g/eq), and 11 parts of the thermoplastic resin (C-1) were mixed at 150° C. and were cooled, and then, 79 parts of hydroxy ethyl methacrylate, 22 parts of polyamide particles ("2001UD", manufactured by Arkema S.A.), 3 parts of a polymerization initiator ("Trigonox 122-C80", manufactured by Kayaku Akzo Corporation: organic peroxide), 20 parts of a mixture of polymethylene polyphenyl polyisocyanate and diphenylmethane diisocyanate ("MILLIONATE MR-200", manufactured by Tosoh Corporation), and 80 parts of 4,4'-diphenylmethane diisocyanate were mixed and were applied onto one surface of a PET release film, and then, a carbon fiber ("TRK979PQRW", manufactured by Mitsubishi Rayon Co., Ltd.) was impregnated by a hand lay-up method such that a carbon fiber content was 55%, was covered with the same PET release film, and then, was aged in a condition of 45° C. for 24 hours, and thus, a prepreg (3) was prepared. A molar ratio (NCO/OH) of the raw materials in the prepreg (3) excluding the carbon fiber was 0.93. In addition, a thickness was 0.25 mm.

Example 4: Manufacturing and Evaluation of Prepreg Resin Composition (4)

19 parts of NEWPOL BPE-20 (manufactured by Sanyo Chemical Industries, Ltd.: EO Adduct of Bisphenol A, Hydroxyl Equivalent of 164 g/eq), 24 parts of NEWPOL BPE-40 (manufactured by Sanyo Chemical Industries, Ltd.: EO Adduct of Bisphenol A, Hydroxyl Equivalent of 204 g/eq), and 22 parts of the thermoplastic resin (C-2) were mixed at 150° C. and were cooled, and then, 79 parts of hydroxy ethyl methacrylate, 3 parts of a polymerization initiator ("Trigonox 122-C80", manufactured by Kayaku Akzo Corporation: organic peroxide), 20 parts of a mixture of polymethylene polyphenyl polyisocyanate and diphenylmethane diisocyanate ("MILLIONATE MR-200", manufactured by Tosoh Corporation), and 80 parts of 4,4'-diphenyl methane diisocyanate were mixed, flowed into molds having thicknesses of 2 mm and 6 mm, and were aged in a condition of 45° C. for 24 hours, and thus, a prepreg resin composition (4) was obtained.

In addition, 19 parts of NEWPOL BPE-20 (manufactured by Sanyo Chemical Industries, Ltd.: EO Adduct of Bisphenol A, Hydroxyl Equivalent of 164 g/eq), 24 parts of NEWPOL BPE-40 (manufactured by Sanyo Chemical Industries, Ltd.: EO Adduct of Bisphenol A, Hydroxyl Equivalent of 204 g/eq), and 22 parts of the thermoplastic resin (C-2) were mixed at 150° C. and were cooled, and then, 79 parts of hydroxy ethyl methacrylate, 3 parts of a polymerization initiator ("Trigonox 122-C80", manufactured by Kayaku Akzo Corporation: organic peroxide), 20 parts of a mixture of polymethylene polyphenyl polyisocyanate and diphenylmethane diisocyanate ("MILLIONATE MR-200", manufactured by Tosoh Corporation), and 80 parts of 4,4'-diphenylmethane diisocyanate were mixed and were applied onto one surface of a PET release film, and then, a carbon fiber ("TRK979PQRW", manufactured by Mitsubishi Rayon Co., Ltd.) was impregnated by a hand lay-up method such that a carbon fiber content was 55%, was covered with the same PET release film, and then, was aged in a condition of 45° C. for 24 hours, and thus, a prepreg (4) was prepared. A molar ratio (NCO/OH) of the raw materials in the prepreg (4) excluding the carbon fiber was 0.93. In addition, a thickness was 0.25 mm.

Example 5: Manufacturing and Evaluation of Prepreg Resin Composition (5)

19 parts of NEWPOL BPE-20 (manufactured by Sanyo Chemical Industries, Ltd.: EO Adduct of Bisphenol A, Hydroxyl Equivalent of 164 g/eq), 24 parts of NEWPOL BPE-40 (manufactured by Sanyo Chemical Industries, Ltd.: EO Adduct of Bisphenol A, Hydroxyl Equivalent of 204 g/eq), 16 parts of the thermoplastic resin (C-3) were mixed at 150° C. and were cooled, and then, 79 parts of hydroxy ethyl methacrylate, 3 parts of a polymerization initiator ("Trigonox 122-C80", manufactured by Kayaku Akzo Corporation: organic peroxide), 20 parts of a mixture of polymethylene polyphenyl polyisocyanate and diphenylmethane diisocyanate ("MILLIONATE MR-200", manufactured by Tosoh Corporation), and 80 parts of 4,4'-diphenyl methane diisocyanate were mixed, flowed into molds having thicknesses of 2 mm and 6 mm, and were aged in a condition of 45° C. for 24 hours, and thus, a prepreg resin composition (5) was obtained.

In addition, 19 parts of NEWPOL BPE-20 (manufactured by Sanyo Chemical Industries, Ltd.: EO Adduct of Bisphenol A, Hydroxyl Equivalent of 164 g/eq), 24 parts of NEWPOL BPE-40 (manufactured by Sanyo Chemical Industries, Ltd.: EO Adduct of Bisphenol A, Hydroxyl Equivalent of 204 g/eq), and 16 parts of the thermoplastic resin (C-3) were mixed at 150° C. and were cooled, and then, 79 parts of hydroxy ethyl methacrylate, 3 parts of a polymerization initiator ("Trigonox 122-C80", manufactured by Kayaku Akzo Corporation: organic peroxide), 20 parts of a mixture of polymethylene polyphenyl polyisocyanate and diphenylmethane diisocyanate ("MILLIONATE MR-200", manufactured by Tosoh Corporation), and 80 parts of 4,4'-diphenylmethane diisocyanate were mixed and were applied onto one surface of a PET release film, and then, a carbon fiber ("TRK979PQRW", manufactured by Mitsubishi Rayon Co., Ltd.) was impregnated by a hand lay-up method such that a carbon fiber content was 55%, was covered with the same PET release film, and then, was aged in a condition of 45° C. for 24 hours, and thus, a prepreg (5) was prepared. A molar ratio (NCO/OH) of the raw materials in the prepreg (5) excluding the carbon fiber was 0.93. In addition, a thickness was 0.25 mm.

Comparative Example 1: Preparation and Evaluation of Prepreg Resin Composition (R1)

19 parts of NEWPOL BPE-20 (manufactured by Sanyo Chemical Industries, Ltd.: EO Adduct of Bisphenol A, Hydroxyl Equivalent of 164 g/eq), 24 parts of NEWPOL BPE-40 (manufactured by Sanyo Chemical Industries, Ltd.: EO Adduct of Bisphenol A, Hydroxyl Equivalent of 204 g/eq), 79 parts of hydroxy ethyl methacrylate, 3 parts of a polymerization initiator ("Trigonox 122-C80", manufactured by Kayaku Akzo Corporation: organic peroxide), 20 parts of a mixture of polymethylene polyphenyl polyisocyanate and diphenyl methane diisocyanate ("MILLIONATE MR-200", manufactured by Tosoh Corporation), and 80 parts of 4,4'-diphenyl methane diisocyanate were mixed, flowed into molds having thicknesses of 2 mm and 6 mm, and were aged in a condition of 45° C. for 24 hours, and thus, a prepreg resin composition (R1) was obtained.

In addition, 19 parts of NEWPOL BPE-20 (manufactured by Sanyo Chemical Industries, Ltd.: EO Adduct of Bisphenol A, Hydroxyl Equivalent of 164 g/eq), 24 parts of NEWPOL BPE-40 (manufactured by Sanyo Chemical Industries, Ltd.: EO Adduct of Bisphenol A, Hydroxyl Equivalent of 204 g/eq), 79 parts of hydroxy ethyl methacrylate, 3 parts of a polymerization initiator ("Trigonox 122-C80", manufactured by Kayaku Akzo Corporation: organic peroxide), 20 parts of a mixture of polymethylene polyphenyl polyisocyanate and diphenyl methane diisocyanate ("MILLIONATE MR-200", manufactured by Tosoh Corporation), and 80 parts of 4,4'-diphenyl methane diisocyanate were mixed and were applied onto one surface of a PET release film, and then, a carbon fiber ("TRK979PQRW", manufactured by Mitsubishi Rayon Co., Ltd.) was impregnated by a hand lay-up method such that a carbon fiber content was 55%, was covered with the same PET release film, and then, was aged in a condition of 45° C. for 24 hours, and thus, a prepreg (R1) was prepared. A molar ratio (NCO/OH) of the raw materials in the prepreg (R1) excluding the carbon fiber was 0.93. In addition, a thickness was 0.25 mm.

Flexibility and impact resistance were evaluated as with Example 1, except that the prepreg resin composition (1) used in Example 1 was changed to the prepreg resin compositions (2) to (5) and (R1).

Further, molded articles (2) to (5) and (R1) were prepared, and molding properties and heat resistance were evaluated, as with Example 1, except that the prepreg (1) used in Example 1 was changed to the prepregs (2) to (5) and (R1).

Evaluation results of the prepreg resin compositions (1) to (5) and (R1) obtained as described above are shown in Table 1.

TABLE 1

| | | | Example 1 | Example 2 | Example 3 | Example 4 | Example 5 | Comparative Example 1 |
|---|---|---|---|---|---|---|---|---|
| Prepreg resin composition | | | (1) | (2) | (3) | (4) | (5) | (R1) |
| Urethane (meth)acrylate (parts by mass) | Polyisocyanate (a1) | MR-200 | 20 | 20 | 20 | 20 | 20 | 20 |
| | | MDI | 80 | 80 | 80 | 80 | 80 | 80 |
| | Polyol (a2) | BPE-2C | 19 | 19 | 19 | 19 | 19 | 19 |
| | | BPE-4C | 24 | 24 | 24 | 24 | 24 | 24 |
| | Hydroxy alkyl (meth)acrylate (a3) | HEMA | 79 | 79 | 79 | 79 | 79 | 79 |
| Thermoplastic resin (parts by mass) | (C-1) | | 44 | 22 | 11 | | | |
| | (C-2) | | | | | 22 | | |
| | (C-3) | | | | | | 16 | |
| Evaluation result | Flexibility (extension rate) | | ○ | ○ | ○ | ○ | ○ | x |
| | Impact resistance (fracture toughness) | | ○ | ○ | ○ | ○ | ○ | x |
| | Molding properties | | ○ | ○ | ○ | ○ | ○ | ○ |
| | Heat resistance of molded article | | ○ | ○ | ○ | ○ | ○ | ○ |
| | Flexibility (bending strength) of molded article | | ○ | ○ | Δ | ○ | ○ | x |

It was checked that the prepreg resin compositions of the invention in Examples 1 to 6 were capable of forming a cured product excellent in flexibility and impact resistance, a prepreg excellent in molding properties, and a molded article excellent in heat resistance and flexibility.

On the other hand, Comparative Example 1 is an example in which the thermoplastic resin that is an essential component of the invention is not contained, and it was checked that the flexibility and the impact resistance of the cured product, and the flexibility of the molded article were insufficient.

The invention claimed is:

1. A prepreg resin composition, comprising:
   a urethane (meth)acrylate (A) that is a reaction product of polyisocyanate (a1), polyol (a2), and hydroxy alkyl (meth)acrylate (a3);
   a polymerization initiator (B); and
   a thermoplastic resin (C), as an essential component,
   wherein the polyisocyanate (a1) is at least one polyisocyanate selected from 2,4'-diphenyl methane diisocyanate, 4,4'-diphenyl methane diisocyanate, a carbodiimide modified product of 4,4'-diphenyl methane diisocyanate, and polymethylene polyphenyl polyisocyanate;
   wherein the thermoplastic resin (C) is a thermoplastic polyurethane resin containing polyalkylene ether polyol as an essential raw material; and
   wherein the thermoplastic resin (C) is in a range of 1% by mass to 25% by mass based on the total mass of the prepreg resin composition.

2. The prepreg resin composition according to claim 1, wherein the thermoplastic resin (C) has a weight average molecular weight of 5,000 to 1,000,000.

3. A prepreg comprising:
   the prepreg resin composition according to claim 1; and
   a reinforcing fiber (D).

4. A molded article, comprising:
   a product obtained by curing the prepreg according to claim 3.

5. A prepreg comprising:
   the prepreg resin composition according to claim 2; and
   a reinforcing fiber (D).

6. A molded article, comprising:
   a product obtained by curing the prepreg according to claim 5.

* * * * *